United States Statutory Invention Registration [19]

[11] Reg. Number: H113

McNeel [45] Published: Aug. 5, 1986

[54] WATERBLOCK AND STRAIN RELIEF FOR ELECTRICAL CONNECTORS

[76] Inventor: William McNeel, 9411 Neff, Houston, Tex. 77036

[21] Appl. No.: 822,373

[22] Filed: Jan. 27, 1986

[51] Int. Cl.[4] ..... H01R 13/58

[52] U.S. Cl. ..... 339/105; 339/166 R

*Primary Examiner*—Charles T. Jordan

[57] ABSTRACT

A water tight connector assembly having an internal tee-shaped brace where the flanges of the brace have a plurality of electrical contacts fixed therein. A plurality of wire conductors, having a portion of their insulating jackets removed, are laced through holes in the stem of the brace and soldered to the contacts fixed in the flanges. The elbows of the laced conductors are partially untwisted and are flow-soldered to form a waterblock therealong. The laced conductors, and portions of the brace and insulating jackets, are encased on an epoxy resin which in turn is surrounded by a molded polyurethane connector body having a predetermined configuration.

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

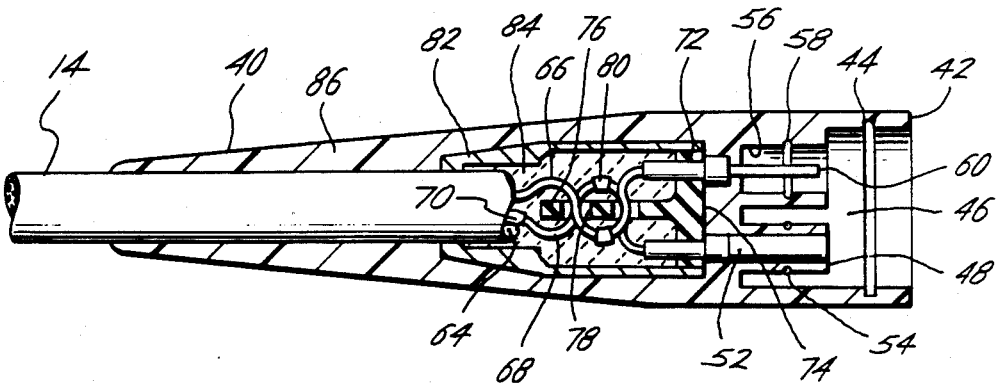

WATERBLOCK AND STRAIN RELIEF FOR ELECTRICAL CONNECTORS

BACKGROUND OF THE INVENTION

1. Field of the Invention

This invention relates to connectors and more particularly to electrical connectors used in moisture-laden environments.

2. Description of the Related Art

In seismic exploration, as well as in other types of industry, it is sometimes necessary to make and maintain electrical connections in moisture-laden environments. The amounts of moisture may range from a very humid laboratory chamber to the bottom of the ocean. For obvious reasons, the most important characteristic about the type of electrical connector used is that it maintain a watertight seal. A connector that allows the smallest amount of moisture past its barriers may prove to be nearly if not completely fatal. For example, in seismic surveys across marshy or swamp-like environments, a leaky connector may be responsible for an inoperative array of 1000 or more sensors.

In general there are many different types of watertight electrical connectors, but all of them have at least two characteristics in common: at least one cable entering the connector body, and at least one end designed to mate with a similar connector. Both of the characteristics mentioned above are perhaps responsible for a clear majority of connector failures. A myriad of connectors have been introduced to solve water leakage along the connector face. A typical connector of this type is disclosed in U.S. Pat. No. 4,445,741 issued I. R. Annoot in May, 1984. Many of these connectors have proven to be successful at keeping water out of the connector face.

A majority of electrical connectors suffer signal loss because of decreased resistance and consequent electrical leakage due to water wicking along the stranded conductor cable from the rear of the connector. The stranded electrical conductors of the cable are often enclosed in a molded, polyurethane connector body and have no other barrier to prevent water leakage other than the molded jacket. This type of barrier often fails when a tensional force is introduced between the cable and the connector body. The tension causes a necking down of the cable, providing a greater passage for the moisture to enter. Occassionally, tension along the cable also results in the tension being applied to the electrical conductors and breaks the connection thereto.

Several different techniques have been implemented to prevent moisture from reaching the exposed conductors. One such technique involved a rubber washer or grommet compressed around the conductor cable at the entrance to the connector by way of a gland nut. It was also suggested that the seal be anchored to the cable within the housing. In a variation of the above technique, a plurality of seals in series compressed by a single gland nut were to provide protection, however each of the above techniques failed under normal use. A successful method involved a connector having a design that clamped to the conductor cable well ahead of the seals to prevent necking down of the cable. A disadvantage to this method is the elaborate construction and the cost ineffectiveness.

SUMMARY OF THE INVENTION

The purpose of the invention is to provide an electrical connector assembly for use in water-saturated environments where the integrity of the circuit is maintained.

It is another purpose of this invention to provide an internal mechanism for absorbing tensional strain applied through the conductors so as to insure electrical continuity.

In accordance with an aspect of this invention, a connector assembly is provided that prevents the leakage of moisture into the connector interior.

In accordance with another aspect of this invention a mechanism is provided for relieving tensional-induced stress along the conductors that could result in separation of the connection between the connector contacts and the conductors.

The instant invention includes an internal tee-shaped brace wherein the flanges of the brace solidly retain electrical contacts extending therethrough. A plurality of wire conductors, having their insulating jackets removed, are laced through holes within the stem of the brace and soldered to the contacts held in the flanges. The elbows of the laced wire conductors are partially untwisted and are flow soldered, forming a solder ball that acts as a water block. A rigid housing interconnects the flanges of the brace to the conductor cable and is filled with an epoxy resin. The resin-filled housing forms an internal anchor when encased by the molded connector-body.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
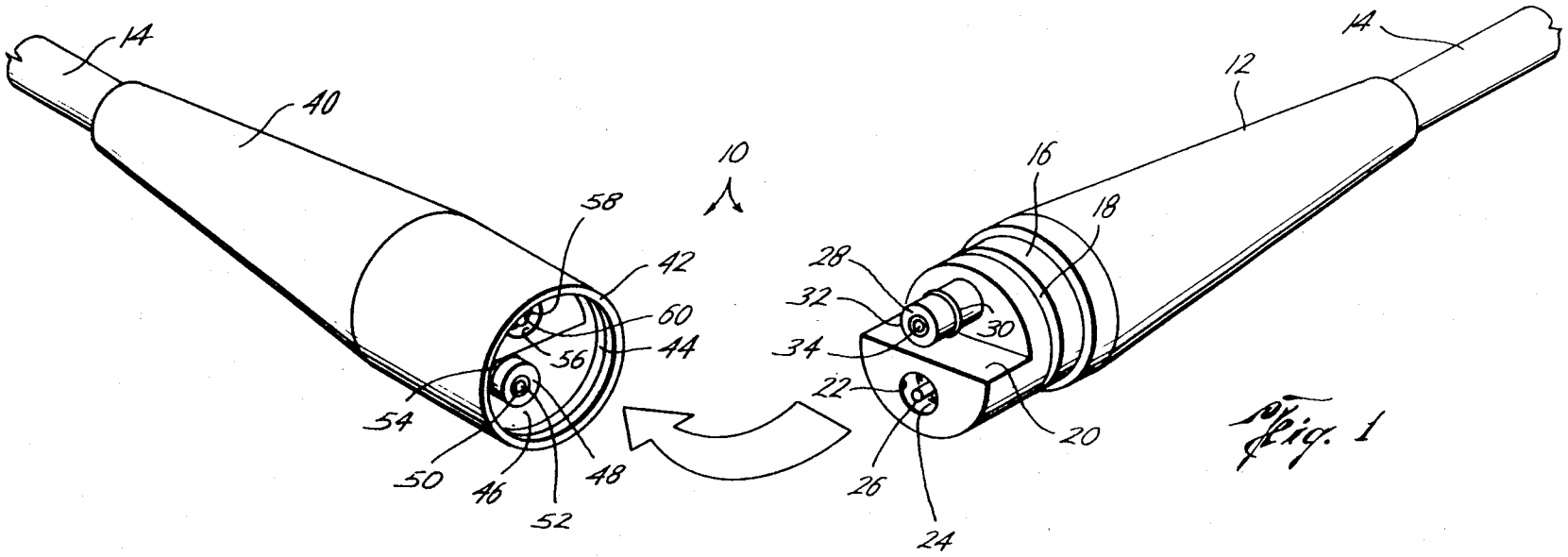
FIG. 1 is a perspective view of two components comprising the connector assembly.

Referring to FIG. 1, wherein like reference characters indicate like components, each half of a connector assembly 10 is shown in a perspective view. The right side of the Figure illustrates a male connector body 12 having one end receiving the end of a multiconductor cable 14. The other end of the body 12 includes a cylindrical male portion 16 having an o-ring 18 concentrically molded therearound. A concentric semicylindrical extension 20 of the male portion 16 has a cylindrical bore 22 defined therein parallel to the axis of body 12, in which an o-ring receiving groove 24 is molded around the inside wall. Extending up through the bottom of bore 22 and concentric therewith is a pin 26. Laterally offset from the semicylindrical extension 20 and parallel thereto is a cylindrical extension 28 of male portion 16, having an o-ring 30 molded therearound. Cylindrical extension 28 has a concentric bore 32 therein wherein electrical socket 34 is disposed.

A female connector body 40 having one end receiving the end of cable 14 is shown on the left side of FIG. 1. The other end of body 40 includes a cylindrical socket 42 having an o-ring receiving groove 44 molded around the inside wall. A concentric semicylindrical extension 46 of socket 42 has a cylindrical plug 48 protruding from the bottom thereof. Plug 48 has a bore 50 defined therein in which an electrical socket 52 is mounted. An o-ring 54 is molded concentrically around plug 48 similar to that around extension 28 of the male body 12. A cylindrical extension 56 of socket 42, having an o-ring receiving groove 58 molded around the inside wall, is laterally displaced from the semicylindrical extension 46 and parallel thereto. A pin 60 extends up through the bottom of cylindrical extension 56.

Each of the connectors bodies, 12 and 40, and the integral plug and socket portions thereof are formed by a molding process using polyurethane plastic or similar material. It is preferred that the polyurethane or like material have a type-D durometer hardness within the range of 70 to 90 on a scale of 0 to 100.

Although each half of the connector 10 has a substantially different shape than its mate, the differences stop at the exterior. The internal construction of each connector body is identical with a small difference being the reversal of the electrical contact arrangement in each half.

Figure 2:
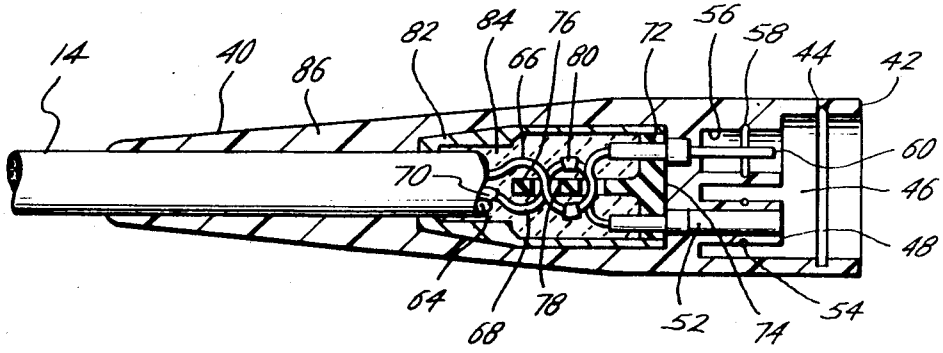
FIG. 2 is a cross-sectional view of one of the connector components.

Refer to FIG. 2 where, for the sake of simplicity, only the female half 40 of the connector 10 is shown in cross section. One end of a multi-conductor cable 14 has a approximately 2 inches of its outer insulating jacket 64 removed, exposing the multiple insulated conductors 66 and 68. For example, and not by way of limitation, only two conductors 66 and 68 are shown in the Figure. It is understood that any number of conductors may be employed. Each conductor 66 and 68 may consist of 28 to 30 American-Weight Gauge stranded wires encased in an insulating jacket generally indicated as 70. The insulating jacket 70 is in turn stripped from a preselected length of each conductor 66 and 68 exposing the twisted-wire core.

Pins and sockets such as 60 and 52 respectively, each have one end extending through and fixed within flanges 72 of the tee-shaped, strain-relief brace 74 within the interior of each connector half 12 and 40. The stem 76 of brace 74 has a plurality of holes, generally indicated as 78, transversely extending therethrough. The exposed lengths of each wire conductor 66 and 68 mentioned earlier are laced through the holes 78 within brace 74 in a direction parallel to the axis of the connector body. The elbows of each wire lace 66 and 68 have been partially untwisted and flow soldered, forming a solder ball 80 infilling the spaces between the individual wire strands of the conductors. Each conductor is retwisted after each solder ball 80 and laced the rest of the way through brace 74. The ends of each conductor 66 and 68 are connected to the ends of pin and socket 52 and 60 respectively, fixed within flanges 72.

A cylindrical housing 82 enclosed the laced conductors 66 and 68 and is closed by the flanges 72 at one end and at the other end by conductor cable 14. A select epoxy resin 84, such as type CN-874 manufactured by Mereco Company infills housing 82, surrounding the ends of the pins and sockets such as 52 and 60 within flanges 72, the laced wire conductors 66 and 68, brace stem 76, and a predetermined length of cable 14. The expoxy resin 84 forms a watertight seal within housing 82 and reacts chemically with cable 14 firmly anchoring it within the housing. A predetermined length of the end of cable 14 and the housing 82 and protruding pins and sockets such as 52 and 60, are in turn enclosed by the molded polyurethane connector body 86.

In operation, the matable halves 12 and 40 of connector 10 are coupled such that pins 26 and 60 mate with sockets 34 and 52. The labyrinth of molded plugs and sockets and their associated o-rings form a watertight seal between the electrodes and the atmosphere. Moisture is prevented from reaching the conductors through connector body 12 and 40 by a trio of barricades. The molded polyurethane body 86 surrounding the conductors and approximately 3 inches of the cable jacket 64, forms a first substantially impenetrable moisture barrier to the connector interior. If moisture manages to wick along the boundary between the conductor jacket 64 and the polyurethane body 86, the epoxy resin 84 within housing 82, surrounding conductors 66 and 68 and a portion of the cable jacket 64, forms the second moisture barrier. However, if moisture manages to breech the polyurethane jacket 86 and the epoxy resin 84 and reach the conductors 66 and 68 therein, the amount of moisture allowed to wick along each conductor will be restricted by the last barrier, that of the solder-ball water blocks 80. The trio of barriers work in concert to prevent moisture from reaching the conductors and decreasing current resistance thus possibly disrupting the signal flow therealong.

The internal strain-relief brace 74 in combination with the epoxy infill 84 acts as an anchor and prevents any tensional stress between the connector body 12 or 40 and the cable 14 from breaking the connection of the conductors 66 and 68 to the electrical contacts.

It is understood that the connector body described above is presented by way of example only and not by way of limitation. The instant invention may be employed in any desirable connector configuration with any number of electrical contacts.

For illustrative purposes, my invention has been described with a certain degree of specificity. Variations will occur to those skilled in the art but which may be included within the scope and spirit of this invention which is limited only by the appended claims.

I claim as my invention:

1. A watertight connector assembly, including a first and a second connector, each having at least one end receiving a cable having at least two stranded conductors therein, and another end for engaging said other connector in a watertight arrangement, comprising:

(a) strain relief means disposed within each of said connectors and having said stranded conductors laced therethrough.

(b) at least two contacts disposed within said strain-relief means, each connected to one of said conductors, said contacts and strain-relief means arranged within said connector so that said contacts are disposed in said end of said connector for engaging said other connector; and (c) water block means within said connector for preventing moisture from entering therein.

2. A method for manufacturing a watertight connector assembly, comprising the steps of:

(a) stripping the insulation from a predetermined length of one end of a multiconductor cable exposing a plurality of stranded-wire conductors;

(b) flowing a predetermined amount of solder between each of a plurality of wire strands comprising said stranded conductors, forming a solder ball so as to create a waterblock therein;

(c) lacing said plurality of stranded conductors through a tee-shaped, strain-relief brace and connecting the end of each of said conductors to one each of a plurality of electrical contacts mounted thereon;

(d) sealing said brace, laced conductors, and a predetermined portion of said cable in a preselect epoxy resin so as to prevent moisture from penetrating therein; and (e) molding a polyurethane connector body around said epoxy resin and predetermined length of said cable such that said contacts are disposed within said connector body so as to be able to mate with a compatible connector body, said polyurethane used in said molding having a durometer hardness within the range of 70 to 90 determined by a Type-D durometer.

3. A watertight connector assembly as recited in claim 1 wherein said strain-relief means, comprises:

(a) a tee-shaped brace including a stem having a plurality of holes extending therethrough, and a first and second flanges, each having at least one hole extending therethrough.

(b) one end of said contacts extending through said holes in said flanges and fixed therein;

(c) said conductors laced through said holes in said stem and connected to said ends of contacts extending through said flanges so that a tensional stress between said conductors and said brace results in a tightening of the conductors laced through said brace without decoupling from the contacts; and (d) an epoxy resin enclosing said laced conductors and predetermined portion of said brace and said cable forming a seal therearound.

4. A watertight connector assembly as recited in claim 3 wherein said waterblock means, comprises:

(a) a solder ball flow-soldered at predetermined locations around a plurality of wire strands comprising each of said conductors so as to form solid wire portions.

(b) an epoxy resin deposited around said conductors having said solder balls formed thereon and a predetermined portion of said brace and said cable; and (c) a polyurethane connector body, having a Type-D durometer hardness within the range of 70 to 90, molded around said epoxy resin and a predetermined length of said cable.

5. A method for manufacturing as recited in claim 2, wherein the step of flowing solder in said stranded conductors, further comprises:

(a) partially untwisting said stranded conductors at predetermined locations into an elliptical fan; and (b) flowing solder between said wire strands in said elliptical fan forming a solder ball therearound.

* * * * *